United States Patent
Reid et al.

(10) Patent No.: US 6,412,449 B1
(45) Date of Patent: Jul. 2, 2002

(54) SEGMENTED LANCE ASSEMBLY

(75) Inventors: Colin Reid, Arthur; Dana L. Joudrey, Scotland, both of (CA)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/124,130

(22) Filed: Jul. 29, 1998

(51) Int. Cl.$^7$ .............................................. F22B 37/48
(52) U.S. Cl. ........................ 122/379; 122/390; 122/392
(58) Field of Search ................................ 122/379, 380, 122/382, 383, 384, 390, 392; 165/95; 376/316; 15/316.1

(56) References Cited

U.S. PATENT DOCUMENTS

| | | | |
|---|---|---|---|
| 4,980,120 A | 12/1990 | Bowman et al. | 376/316 |
| 5,341,406 A | * 8/1994 | Jens et al. | 165/95 |
| 5,411,043 A | 5/1995 | Kamler | 134/167 |
| 5,509,609 A | 4/1996 | Kamler | 239/461 |
| 5,555,851 A | 9/1996 | Vandenberg | 122/392 |
| 5,570,660 A | 11/1996 | Vandenberg | 122/379 |
| 5,570,969 A | 11/1996 | Kamler | 403/268 |
| 5,572,957 A | 11/1996 | Vandenberg | 122/379 |
| 5,782,209 A | * 7/1998 | Vandenberg | 122/379 |

FOREIGN PATENT DOCUMENTS

| | | |
|---|---|---|
| JP | 51-112872 | 9/1976 |
| JP | 5-116092 | 5/1993 |
| JP | 3057366 | 5/1999 |
| WO | WO-96/17695 | * 6/1996 |

* cited by examiner

*Primary Examiner*—Jiping Lu
(74) *Attorney, Agent, or Firm*—Eric Marich

(57) ABSTRACT

A lance assembly for insertion into a steam generator chamber includes a hinged support for guiding the lance within the chamber which may be stored easily in a smaller space outside the chamber when not in use. One embodiment of the support has left and right side support guides formed from multiple hinged segments that surround the lance when inside the chamber. The hinges are axially offset from one another along a length of the assembly and pivot in opposite directions so that the guide is rigid inside the chamber yet allowing the lance to move therein. In an alternate embodiment, a single guide is used having multiple hinged segments. The hinged segments are locked in place immediately prior to being fed into the chamber. The segments may be folded over each other for storage in a smaller space.

13 Claims, 5 Drawing Sheets

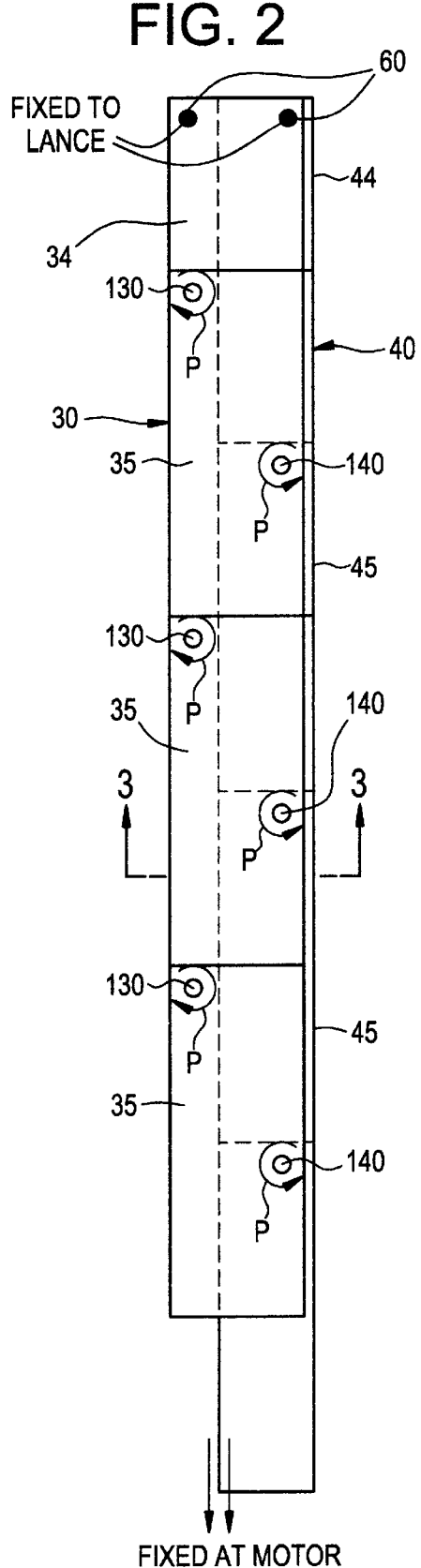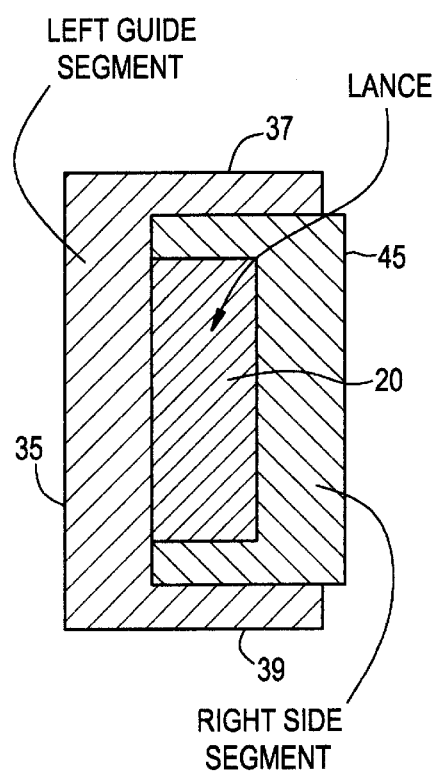

SEGMENTED LANCE ASSEMBLY

FIELD AND BACKGROUND OF THE INVENTION

The present invention relates generally to the field of steam generator cleaning, and in particular to a new and useful apparatus and method for removing sludge from and obtaining access to the interbundle region of a steam generator chamber or other similar confined spaces.

In nuclear power stations, steam generators, such as recirculating steam generators and once through steam generators, are used for heat exchange purposes in the generation of steam to drive the turbines. Primary fluid which is heated by the core of the nuclear reactor passes through a bundle of tubes in the steam generator. Secondary fluid, normally water, which is fed into the space surrounding the tubes, receives heat from the tubes and is converted into steam for driving the turbines. After cooling and condensation has occurred, the secondary fluid is directed back into the space around the tubes to provide a continuous steam generation cycle. Due to the constant high temperature and severe operating conditions, sludge accumulates on the lower portions of the tubes and on the tubesheet which supports same. The sludge is comprised mainly of an iron oxide such as magnetite, and reduces the heat transfer efficiency of the tubes and can cause corrosion. Thus, the tubes must be cleaned periodically to remove the sludge. Various types of apparatus and method are available to accomplish this task.

It is often advantageous to removably insert lances, which may carry water lines, video cameras and other items, into steam generator chambers for cleaning, inspection and testing. However, in order to reach the far walls of the generator chamber or into interior chambers between the heat exchange tubes, relatively elongated flexible lances are required. Support for the lances and other items is required to accurately direct the operating ends within the steam generator for intertube cleaning, inspection, and/or maintenance. The space adjacent the exterior of steam generators in nuclear plants is usually limited due to other considerations. Extremely long, inflexible lances and supports have limited utility since storage during non-use is difficult or impossible.

Related information on sludge lances can be found in the disclosures of U.S. Pat. Nos. 4,980,120 to Bowman et al.; U.S. Pat. Nos. 5,411,043, 5,509,609, and 5,570,969 to Kamler; and U.S. Pat. Nos. 5,555,851, 5,570,660, and 5,572,957 to Vandenberg.

SUMMARY OF THE INVENTION

It is an object of the present invention to provide a lance for insertion into a nuclear steam generator which is supported inside the steam generator, but which can be stored conveniently in a limited space outside of the steam generator.

It is a further object of the invention to provide a support for a lance or other elongated structure which is flexible outside of the steam generator, but rigid inside the steam generator.

Accordingly, a lance having a segmented support is provided that can be removably inserted through a wall of a nuclear steam generator by a linear motor. The lance has an articulated head at one end which is first inserted into the steam generator chamber. The support has left and right side segments. The segments of each side are pivotally joined together. The joints of the left and right sides pivot opposite those of the other side, and the joints between the segments are horizontally offset from each other. One side of the segments may be nested inside the other around the lance.

The lance and segments are fed into the steam generator by a single linear motor through an opening in the steam generator wall. The segments of each support side may be coiled prior to feeding. One end segment on each side is fastened near the end of the lance adjacent the articulated head. The articulated head extends past the support and may be moved relative to the remainder of the supported lance to direct a working end of the lance at a particular work surface for inspection, cleaning, maintenance or testing.

In an alternate embodiment of the support, a series of rigid segments having a channel support for the lance are joined by hinges which permit folded storage of the support outside the steam generator chamber. The hinges may be locked when the support is in use immediately prior to insertion through the steam generator chamber wall. Similarly, a single linear guide motor may be used or two motors employed to insert the lance and support through the chamber wall. An articulated head extends from the end of the rigid support inside the steam generator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a top plan view of a support according to the invention;

FIG. 3 is a sectional view of the support and lance taken along line 3—3 of FIG. 2;

DESCRIPTION OF THE PREFERRED EMBODIMENTS

Figure 1:
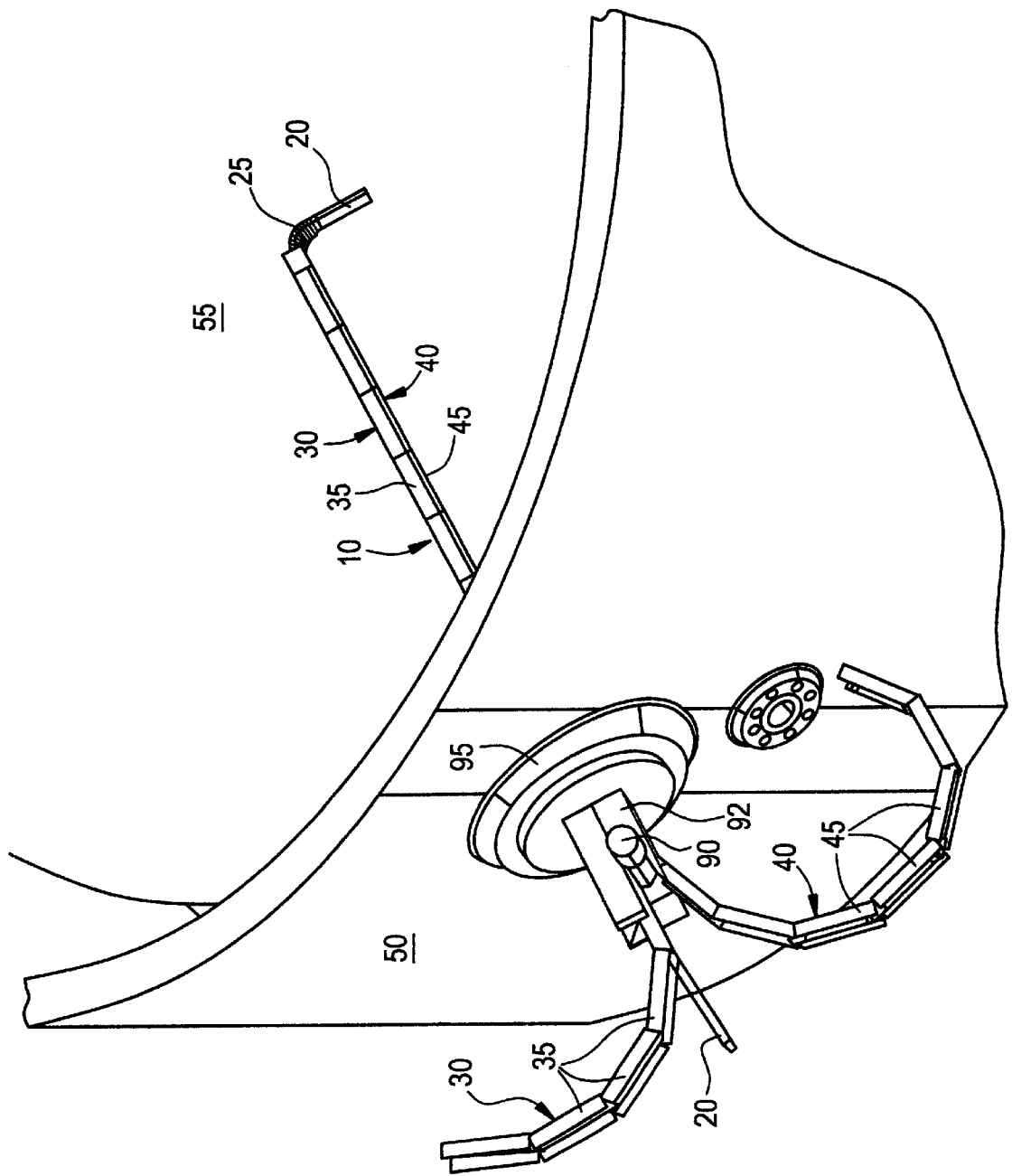
FIG. 1 is a perspective view of a chamber having a lance and support according to the invention.

Referring now to the drawings, in which like reference numerals are used to refer to the same or functionally similar elements, FIG. 1 shows a nuclear steam generator chamber 55 (and, for clarity, without the heat exchanger tubes that are normally situated therein) having a chamber wall 50 holding a lance structure 10. Chamber 55 includes but is not limited to a U-tube bundle heat exchanger known in the nuclear steam generator arts as having a "no-tube-lane" approximately in the center with an annulus around the steam generator periphery. There are a plurality of heat exchanger tubes (not shown) within the steam generator with a predetermined spacing or lanes between the tubes. Steam generator may be of the CANDU style or otherwise. Lance structure 10 has a flexible lance 20 inserted through a drive motor 90 (advantageously a linear drive motor) mounted on a bracket 92, which is preferably fastened to a rotatable mount bracket 95 along with left and right support guides 30, 40, respectively.

The lance 20 is preferably constructed as disclosed in U.S. Pat. No. 5,570,969 to Kamler which is hereby incorporated by reference as though fully set forth herein. An articulated guide head 25 permits the lance 20 to be oriented at selected areas and moved inside the chamber 55, such as the inter-bundle tube region (not shown) or otherwise inaccessible areas. The lance 20 may be employed for supplying a cleaning fluid like water for cleaning these areas, or for carrying a video camera and associated cables and/or fiber optics for inspection of the chamber 55, or for carrying other maintenance or inspection instruments and tools for search and retrieval or testing the integrity of components inside the chamber 55. For purposes of this application, the term "lance" is intended to encompass any of these applications alone, or in combination, such as a water cleaning and inspection with a video camera together.

The left and right support guides 30, 40 are each comprised of a plurality of segments 35, 45 hinged together. As seen in FIG. 2, the hinges 130, 140 of each support guide 30, 40 are constructed to pivot opposite to those of the other support guide 40, 30. The direction in which each hinge 130, 140 can pivot is shown by circular arrows P. The first segment 34, 44 of each support guide 30, 40 is connected to the articulated guide head 25 (or optionally a fixed angle guide head) by a pair of pins 60 or other suitable connectors. The first segment 34 of the left support guide 30 is also preferably shorter, so that the hinges 130 connecting the left side segments 34, 35 are axially offset from one another by about half their length from the hinges 140 of the right side segments 44, 45.

Figure 4:
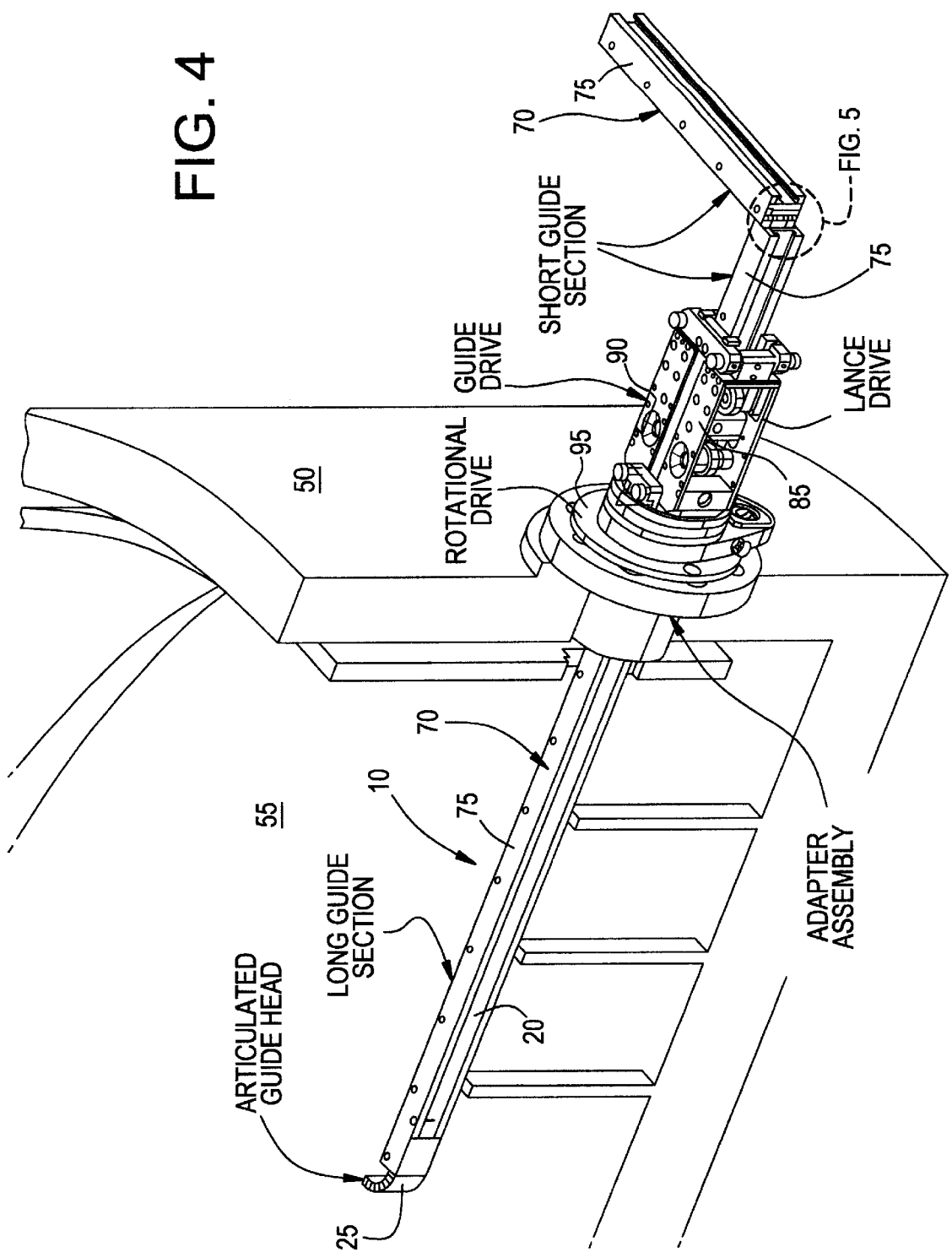
FIG. 4 is a sectional perspective view of an alternate lance and support of the invention.

FIG. 3 more clearly shows the overlapping relationship between the segments 35, 45 of the left and right support guides 30, 40 around the lance 20. The overlap provides improved support and protection for the lance 20 when the support guides 30, 40 are in a use position such as shown in FIGS. 1, 2 and 4. However, the lance 20 is still slidably movable within the support guides, 30, 40, and segments 35, 45 while in the use position.

Returning to FIG. 1, the left and right support guide 30, 40 sections shown outside the wall 50 are in a coiled storage position or simply positioned out of the way. The hinges 130, 140 permit storage of the support guides 30, 40 in a much smaller space than if the guides were not collapsible. From the storage position, the lance 20 and guides 30, 40 may be inserted into the chamber 55 through wall 50 by activating the linear drive motor 90. The drive motor 90 draws both support guides 30, 40 and lance 20 through the wall 50 substantially simultaneously and aligns the elements of the support structure 10 into the use position from the storage position.

Since the hinges 130, 140 pivot in opposite directions and are axially offset from each other along a length of the lance 20, once the support guides 30, 40 are aligned around the lance 20, the left and right support guides 30, 40 form a rigid support and guide for the lance 20 inside the chamber 55 while allowing the lance 20 to slidably move therein. Two structural features work together to make the support guides 30, 40 rigid within the chamber during use: (1) the connection of the support guides 30, 40 to guide head 25 with pins 60, and (2) the fact that the opposite ends of the support guides 30, 40 are held in the drive motor 90 and rotatable mount 95. The lance 20 may be rotated about the insertion axis which includes but is not limited to hand hole, port or inspection openings with rotatable mount 95 so that the working end of the lance 20 may be positioned properly within the chamber 55. A motor (not shown) is used to rotate the system to any desired position as is described in U.S. Pat. No. 5,555,851 to Vandenburg which is also hereby incorporated by reference as though fully set forth herein.

The support guide segments 35, 45 in the use position may simply be press fit together, or alternately magnetic connectors typically employed with drawers or cupboards can be used within the sections where they meet as added support for keeping the guide segments 35, 45 together inside the steam generator.

Still another alternative to provide additional support for keeping support guides segments 35, 45 together inside the steam generator is the use of ball plungers. These devices are well known in the art and are spring loaded balls that may be fastened or placed into the interior of top and/or bottom arms 37, 39, respectively (FIG. 3) of support guide segment 35. A mating notch or indentation in the appropriate location in support guide 45 engages the ball and holds the guides 35, 45 together. Of course, the ball plunger could be located in guide segment 45 with an indentation or notch located on the interior of guide segment 35. Each of the support guide segments 35, 45 may include this feature, or it may be selectively applied to only certain ones of the support guide segments at desired intervals.

An alternate folding lance structure 10 is shown in FIG. 4 in which the lance 20 is supported by a single support guide 70 having at least two hinged guide segments 75, and preferably three or more guide segments 75. The support guide 70 is fed by one or more guide drive motors 85, 90 which are attached to the rotation mount 95 in the chamber wall 50. This second guide drive motor 85 is used to pull the lance 20 through the wall 50 and into alignment with the support, which guide 70 as is described in U.S. Pat. No. 5,555,851.

The guide segments 75 may be folded on the hinges 170 in the storage position so that less linear space is occupied by the support guide 70 when not in use.

Figure 5:
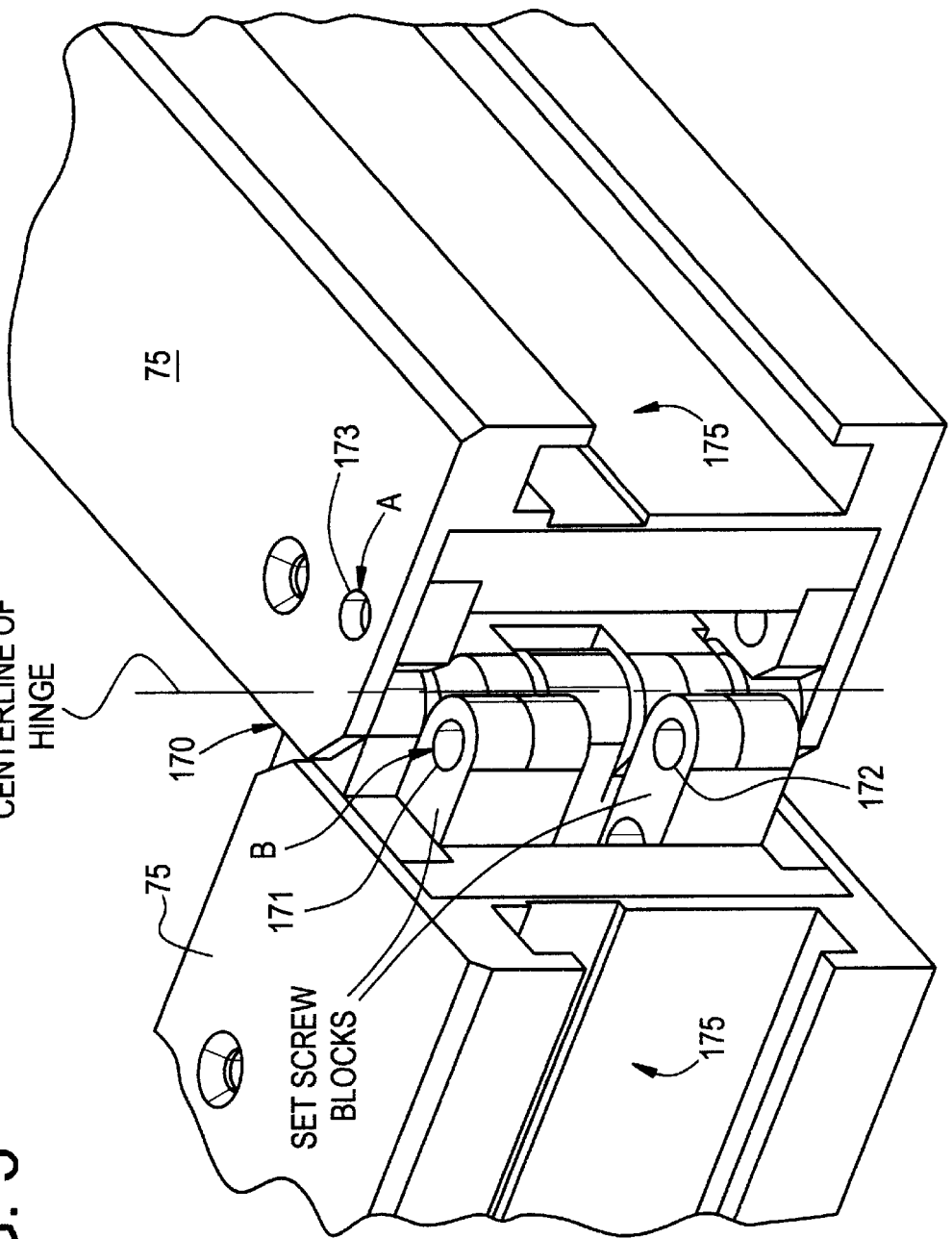
FIG. 5 is an enlarged perspective view of the hinge joint A of FIG. 4.
Figure 6:
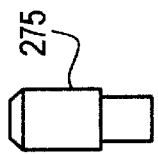
FIG. 6 is a side elevational view of a set screw for use with the hinge joint of FIG. 5.

FIG. 5 shows an enlarged view of the hinge connection A of FIG. 4 between two guide segments 75. As the support guide 70 is inserted into the steam generator chamber 55, adjacent guide segments 75 are moved into an aligned position. A set screw 275, such as shown in FIG. 6, is held in set screw blocks 171, 172 of the guide segment 75. The set screw 275 is turned down at the top end and opening 173 is smaller than those in set screw blocks 171, 172. Thus, the set screw 275 is cap turned and cannot fall out of the support guide 70. When the set screw 275 is secured, the aligned guide segments 75 form a single, rigid support guide 70.

Figure 7:
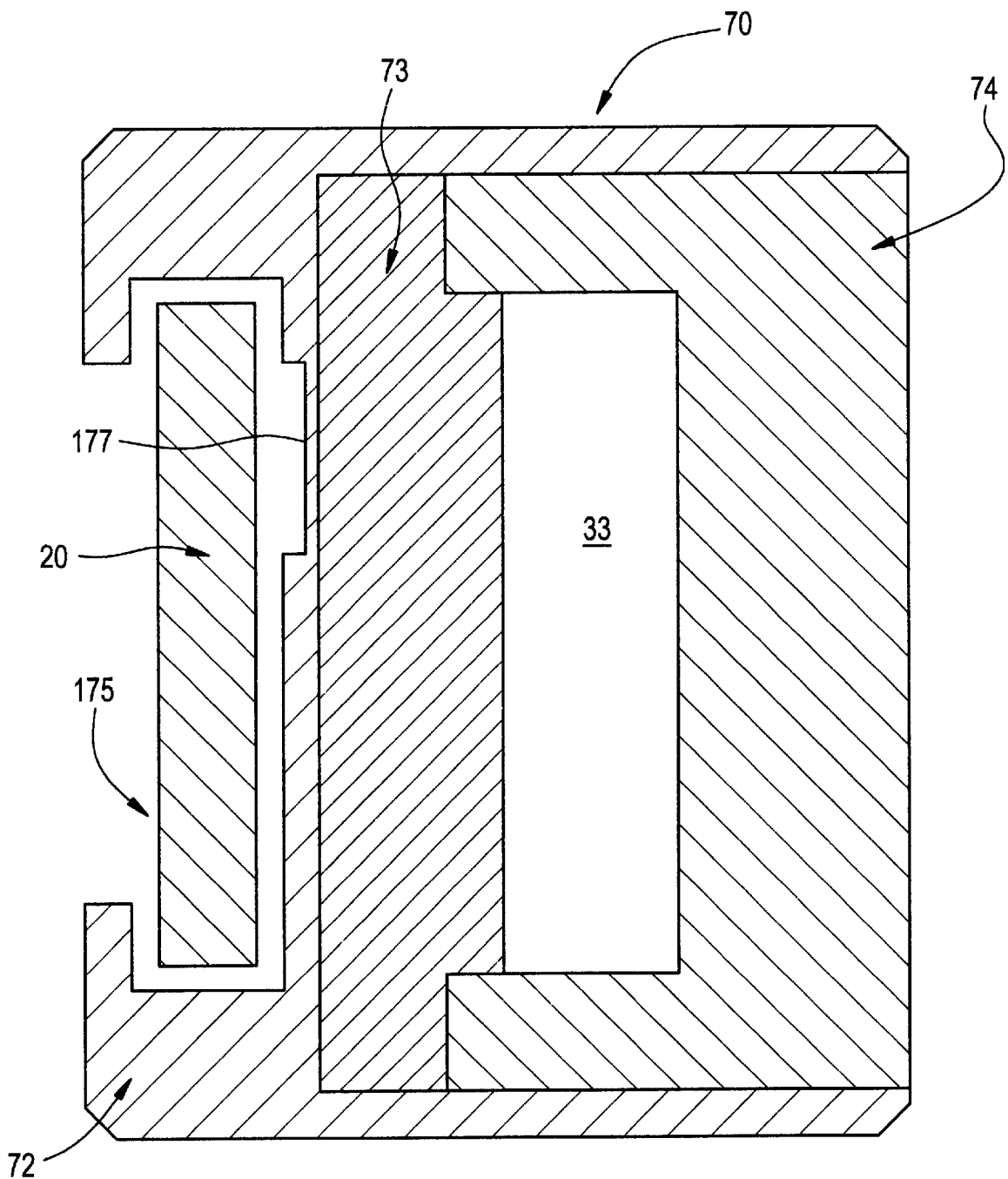
FIG. 7 is a sectional view of an alternate embodiment of the support and lance.

A channel 175 is formed on one side of the support guide 70 for holding the lance 20. Further, a space 33 may be provided through the interior of the support guide 70 for holding cables, wiring or other items being fed into the chamber 55, as best seen in FIG. 7. In this embodiment, support guide 70 is constructed with three parts 72, 73, 74. Cover 72 is preferably constructed of a nylon, polymer, plastic, or material like Tyvar® or Delrin®. This portion includes channel 175 and further includes a smaller channel 177 therein. Channel 177 allows clearance space for an optional video probe attached to lance 20. Cap 73 is preferably constructed of aluminum. Guide 74 is also preferably constructed of aluminum. Cap 73 and guide 74 are removably fastened together with suitable fasteners such as bolts or the like to provide rigidity. Cover 72 is also fastened to the cap and guide 74 with suitable removable fasteners and serves to protect the heat exchanger tubes from abrasion and also houses the lance 20. Space 33 provides a location for wires, video cables, fiber optics, control cables, etc.

While an articulated guide head 25 is shown and described attached to lance guide supports 34, 44, or lance guide 70, it is understood that any guide head may be employed. One suitable example is described in the aforementioned U.S. Pat. No. 5,555,581. The construction of an articulated guide head is also described in detail in U.S. Pat. No. 4,980,120 to Bowman et al. which is also hereby incorporated by reference as though fully set forth herein. If a control cable is used to actuate articulated guide head 25 it may be automated and microprocessor controlled along with drive motor 90.

The lance guide supports, segments, lance guide, mounting brackets, and other components described herein may be made from nylon, polymer, plastic, or thermoplastic materials that preferably have high impact strength. Similarly, metals such as aluminum, stainless steel, brass, light weight alloys and/or metals, or combinations thereof, can be used.

Drive motor 90 engages both the lance guide support segments 35, 45 and lance 20, and positions the lance guide along with the lance 20 to a desired location inside the steam generator. At a desired set location between the tubes, the articulated guide head 25 is actuated to direct the lance 20 down an intertube lane, and a clutch (not shown) is actuated to disengage movement of the lance guide so that only the lance 20 moves between the tubes to a desired location for cleaning, inspecting, and/or maintenance by way of search and retrieval.

The positioning of the lance and lance guide may be achieved with openings and a pinned belt drive assembly as described in U.S. Pat. No. 5,555,851, or it may be accomplished with a belt drive assembly using friction drive rollers. Any suitable drive means can be used for positioning and manipulating the lance and lance guide in the steam generator. It should be understood that the lance and lance guide is capable of being controlled and manipulated manually as well as being automated.

While specific embodiments of the invention have been shown and described in detail to illustrate the application of the principles of the invention, it will be understood that the invention may be embodied otherwise without departing from such principles.

We claim:

1. A lance assembly for inserting into a steam generator chamber, wherein the lance assembly has a use position and a storage position, the lance assembly occupying less space in the storage position than in the use position, the lance assembly comprising:

an elongated flexible lance having an end constructed to fit within the steam generator chamber and an exterior end outside the steam generator chamber; and a lance support assembly for rigidly supporting and guiding the flexible lance within the steam generator chamber in the use position while allowing the flexible lance to slidably move therein, said lance support assembly having a portion connected to a guide head, said lance support assembly being separable from the flexible lance and collapsible when in the storage position, said lance support assembly having left and right support guides which are in an overlapping relationship when they are in the use position, each support guide formed from a plurality of lance guide segments pivotally connected by hinges which are non-pivoting in the use position and pivotable in the storage position, the lance guide segments of the left side support guide pivotally connected in a direction opposite the lance guide segments of the right side support guide, the hinges pivotally connecting the lance guide segments of the left support guide being axially offset from the hinges pivotally connecting the lance guide segments of the right support guide.

2. The lance assembly according to claim 1, further comprising a plurality of fasteners for rigidly locking the plurality of guide segments in an aligned position at the hinges.

3. The lance assembly according to claim 2, wherein the plurality of fasteners comprises a plurality of set screws, each for securing a set screw block in one of the guide segments through an aligned opening in an adjacent aligned guide segment.

4. The lance assembly according to claim 1, wherein the lance includes means for cleaning the interior of the steam generator chamber.

5. The lance assembly according to claim 1, further comprising a drive for moving the flexible lance and the lance support assembly between the use position and the storage position.

6. The lance assembly according to claim 5, wherein the drive comprises a friction drive.

7. A lance assembly for inserting into a steam generator chamber, wherein the lance assembly has a use position and a storage position, the lance assembly occupying less space in the storage position than in the use position, the lance assembly comprising:

an elongated flexible lance having an end constructed to fit within the steam generator chamber and an exterior end outside the steam generator chamber; and a lance support assembly for rigidly supporting and guiding the flexible lance within the steam generator chamber in the use position while allowing the flexible lance to slidably move therein, said lance support assembly having a portion connected to a guide head, said lance support assembly being separable from the flexible lance and collapsible when in the storage position, said lance support assembly having left and right support guides which are in an overlapping relationship when they are in the use position, each support guide formed from at least two lance guide segments pivotally connected by hinges which are non-pivoting in the use position and pivotable in the storage position, the hinges pivotally connecting the at least two lance guide segments of the left support guide being axially offset from the hinges pivotally connecting the at least two lance guide segments the right support guide, so that the left and right support guides of the lance support assembly occupy less space in the storage position than in the use position.

8. The lance assembly according to claim 7, further comprising a drive for moving the flexible lance and the lance support assembly between the use position and the storage position.

9. The lance assembly according to claim 8, wherein the drive comprises a friction drive.

10. The lance assembly according to claim 7, wherein the at least two guide segments forming each of the left and right support guides comprises a plurality of guide segments forming each of the left and right support guides.

11. The lance assembly according to claim 7, further comprising a plurality of fasteners for rigidly locking the guide segments of each support guide in an aligned position at the hinges.

12. The lance assembly according to claim 11, wherein the plurality of fasteners comprises a plurality of set screws, each for securing a set screw block in one of the guide segments through an aligned opening in an adjacent aligned guide segment.

13. The lance assembly according to claim 7, wherein the lance includes means for cleaning the interior of the steam generator chamber.

* * * * *